United States Patent
Coutts et al.

(10) Patent No.: US 9,965,498 B2
(45) Date of Patent: May 8, 2018

(54) PREDICTIVE RESOURCE MANAGEMENT

(75) Inventors: Michael G. Coutts, Newton Mearns (GB); Eric Scheie, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 389 days.

(21) Appl. No.: 12/980,562

(22) Filed: Dec. 29, 2010

(65) Prior Publication Data
US 2012/0173477 A1    Jul. 5, 2012

(51) Int. Cl.
*G06F 7/00*     (2006.01)
*G06F 17/00*    (2006.01)
*G06F 17/30*    (2006.01)

(52) U.S. Cl.
CPC .............................. *G06F 17/30306* (2013.01)

(58) Field of Classification Search
CPC .. G06F 17/30; G06F 17/30306; G06F 15/173; G06F 11/3423; G06F 11/3466
See application file for complete search history.

(56) References Cited

U.S. PATENT DOCUMENTS

| | | | |
|---|---|---|---|
| 7,093,253 B2 | 8/2006 | Beghtel et al. | |
| 7,444,272 B2 | 10/2008 | Alvarez et al. | |
| 7,657,501 B1 | 2/2010 | Brown et al. | |
| 9,515,905 B1* | 12/2016 | Blanding | H04L 43/08 |
| 2003/0126152 A1* | 7/2003 | Rajak | G06F 17/30607 |
| 2008/0306950 A1* | 12/2008 | Richards | G06F 9/505 |
| 2012/0166492 A1* | 6/2012 | Bikkula | G06F 17/30584 707/803 |

OTHER PUBLICATIONS

Yuyitung et al. (WO 2009/100528).*
Dynamic Placement of Virtual Machines for Managing SLA Violations Bobroff et al. (May 2007).*

* cited by examiner

*Primary Examiner* — Azam Cheema
(74) *Attorney, Agent, or Firm* — Ramin Mahboubian

(57) ABSTRACT

Apparatus, systems, and methods may operate to monitor database system resource consumption over various time periods, in conjunction with scheduled data loading, data export, and query operations. Additional activities may include generating a database system resource consumption map based on the monitoring, and adjusting database system workload throttling to accommodate predicted database system resource consumption based on the resource consumption map and current system loading, prior to the current database resource consumption reaching a predefined critical consumption level. The current system loading may be induced by data loading, data export, or query activity. Other apparatus, systems, and methods are disclosed.

18 Claims, 4 Drawing Sheets

PREDICTIVE RESOURCE MANAGEMENT

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code, screen shots, and images described below, and in any drawings appended hereto: Copyright 2010 Teradata, Inc. of Miamisburg, Ohio—All Rights Reserved.

BACKGROUND

It is not uncommon to see the amount of data associated with a business venture grow at an exponential pace. As the size of the database grows, so do the resources and time involved in processing the data. Thus, the data is sometimes stored and managed within the context of an Enterprise Data Warehouse (EDW).

Complex analytics may be applied to the stored data, with a periodicity that varies according to the nature of the data, the nature of the application, and the time of day. For example, in the retail world, individual store managers may operate report generation tools, which issue hundreds of complex queries, at the start and end of their workdays. Within a single time zone, this activity may amount to a significant analytical load being placed on the EDW at certain times of the day, such as after stores open, and after they close. Other periods of significant analytical load (caused by financial report generation) might occur at the end of the week, the end of the month, or the end of the quarter. End of year processing and tax period processing might also constitute points of significant analytical load. Given the frequency of these activities, there may be points in time where large data loads and extensive analytical processing conspire to overwhelm the system.

DETAILED DESCRIPTION

Figure 1:
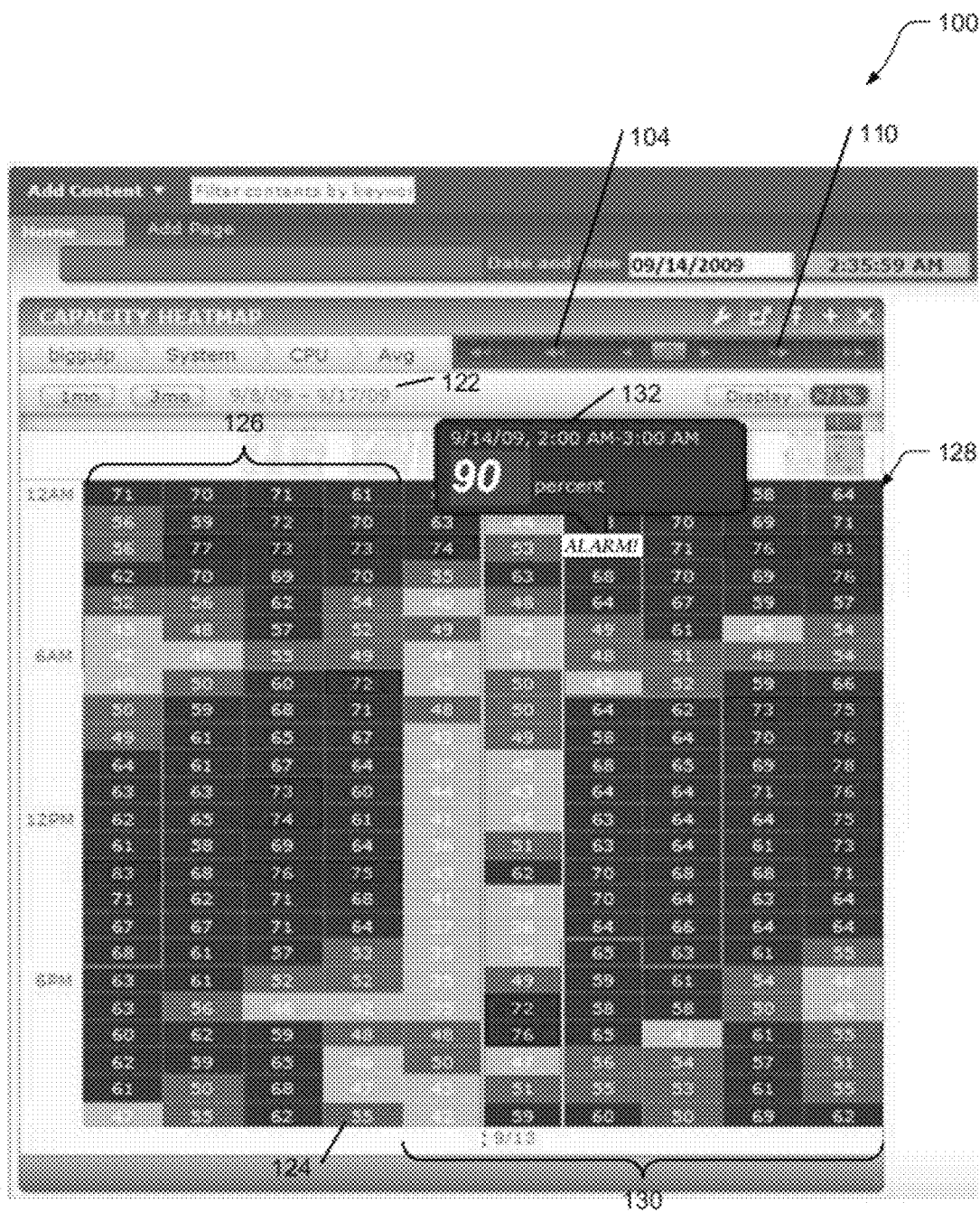
FIG. 1 illustrates a display of predicted future events, according to various embodiments of the invention.
Figure 1:
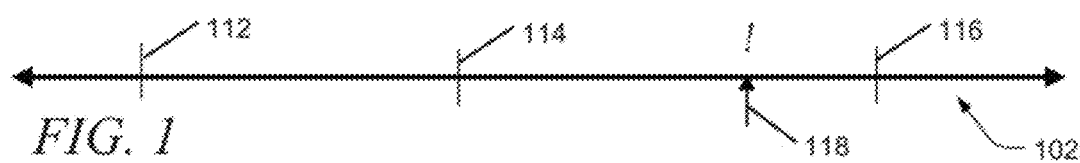

Traditional data warehousing operations include mostly off-hours data analysis for strategic reporting. However, this type of activity is increasingly augmented with business processes during the working day, as well as mission-critical operational processes that can occur at any time. All of these approaches rely upon the underlying database as a passive repository for data that is analyzed, or as an active repository to be queried, and to store operational information that can be used by operational systems to pose tactical data requests.

Customers of the database vendor engage in a number of different activities, including the initial loading of data, the utilization of that data by strategic analysts who build reports (e.g., summaries) based upon the data, and the manipulation of the data by enterprise applications. These enterprise applications often allow manipulation of relatively small sets of control data that is used to apply an algorithm against much larger sets of customer or inventory data in order to generate medium-sized operational data, such as marketing offers in a customer relationship style application, or inventory order data within a demand chain application, for example. Operational (e.g., day-in, day-out, tactical) applications, such as automated teller machines and call centers, may query the offers tables to identify offers applicable to a customer currently being serviced, while an inventory ordering application might use the inventory change data to manage ordering, allocation and shipment of products. Reliance on the underlying database sometimes necessitates the continued operation of mission-critical applications at the expense of less critical applications, perhaps by making them unavailable, or operating them at a reduced level of availability or performance.

As a result, a large proportion of the load on the database is cyclic or periodic, and therefore predictable to some degree. Most of this loading activity comes under the heading of either data loading, or data analysis.

Retailers, for example, typically load sales data into the EDW from their online transaction processing systems in periodic batches, where the update period may remain constant, say every five minutes, with the size of the batch depending on the point in the daily, weekly, monthly or even annual sales cycle. Thus, the size of a given retail load batch may even vary throughout the day, with larger batch sizes occurring during the morning, lunch, and evening periods, when workers get the opportunity to shop. Late evening or overnight batch sizes will likely be smaller. As noted previously, interspersed with the predictable activity, aperiodic, large-sized data loads and extensive analytical processing may sometimes converge to overwhelm the system.

Most mechanical systems, such as a car engine, can safely operate up to their rated limits, but not beyond them, at least not for very long. For this reason, such systems are typically limited in some way. An example includes a steam engine governor that cuts off the supply of steam at a predetermined speed, or in the modern world, an automatic electronic rev limiter that cuts out some or all of the ignition circuit pulses at a predetermined engine operational "red line" speed. While these types of controls may help protect a machine, the occurrence of an overload condition can still be detrimental to the system, causing damage.

Computer systems can similarly be overwhelmed if taken beyond their rated limits. Consider a personal computer with enough active applications open that memory swapping activity consumes more time than executing the applications. While it may appear that the processor is 100% utilized, and that the disk is very active, the reality is that very little of substance is actually being accomplished within the system.

An EDW may face similar issues. Different workloads arise, ranging from loading data, to processing complex queries over the data, to servicing look-up style tactical queries. When the amount of loading applied to the EDW exceeds its capacity, the efficacy of operations may be similar to that noted for the personal computer—most of the processing capability may be spent switching from one workload to another, rather than actually addressing the substantial needs of any one workload. The only way to recover in some cases may be to shut down one or more applications (or other workloads) in order to free up system resources (e.g., CPU cycles, or memory availability). However, the very exercise of trying to access an application in order to terminate execution may actually make matters worse for a short time, by forcing the system to switch to the offending application in order to shut it down.

In the example of the personal computer, exceeding the system resource capacity may cause the mouse and keyboard to become un-responsive, which in some instances leaves only the solution of restarting the computer in order to regain control. In the EDW example, the issue may become one of obtaining external access to the EDW in order to abort execution of one or more workloads. In some cases, the EDW can become so congested that it can't accept even a single connection—leading ultimately to the need for some sort of physical restart within or across the system.

While modern EDWs have mechanisms in place to throttle various workloads, these are often set very conservatively to protect against potential overloads, which means the full power of the EDW is only utilized on rare occasions. As a matter of contrast, in the various embodiments described herein, throttling can be set to a higher average level during normal operation, with increased resource consumption being both detected and predicted, so that throttling can be applied in a more efficient manner, until such time as the predicted problem point has passed.

Workload throttling can be adjusted within the EDW itself by switching from one workload definition, perhaps styled "Normal Operations" (e.g., where workloads A, B, and C have their normal operating parameters) to another definition, styled "Emergency Operations" (e.g., where workloads B and C are given reduced or potentially no access to the EDW, while the more important workload A is given full access when its load on the system increases substantially). This can be accomplished by filtering, throttling, or rejecting SQL requests from workloads B and C. In extreme cases, the EDW user(s), such as servers, associated with workloads B and C may have access rights removed, resulting in a total rejection of all requests from these workloads. External throttling measures may include restricting the size of the connection pool for a particular user, or the number of concurrent reports that can be run through an external application in order to reduce the amount of the workload for B and/or C.

In some embodiments, the behavior of the system is monitored and recorded over some selected period of time, perhaps an extended period of time. Regularly-occurring load jobs and queries and their effect upon the system loading are identified. The signatures of previously-run (non-periodic, but significant according to some selected amount of system loading) queries and their effect on the system are also identified.

This activity may include recording the system resource consumption characteristics (e.g., processor, memory, and input/output (I/O) usage) of periodic load jobs and regularly scheduled complex queries. Thus, if uploading all new retail transactions from an online transaction processing system occurs every fifteen minutes, for example, then each occurrence of that job could be recorded in terms of when it began, when ended, the amount of data loaded, and the amount of resources that were utilized. As discussed earlier, the size of individual load jobs and the resources they consume may depend on the time of day (as dictated by store opening hours or consumer shopping behavior). Other types of periodic load and unload activity, such as end of the week, month, or quarter processing can also be recorded.

Similarly, the consumption characteristics of complex queries can be recorded in terms of when they occur, how long they take, and their resource consumption requirements. As discussed above these could also occur in a periodic manner at the start and end of a work shift, as well as at the end of the week, month, or quarter, etc.

Having established a mechanism to monitor and record previous load and query behavior within the EDW, a historical capacity resource consumption map (sometimes known as a "heat map" by those of ordinary skill in the art) can be generated to indicate periods within the day where the EDW is highly utilized. Traditionally, the resource consumption map might be consulted to identify periods of lower utilization, to re-schedule certain periodic load jobs or complex queries to occur within these quieter time intervals.

However, in various embodiments of the invention, the map can be used to help protect EDW operations in a predictive way, as opposed to traditional after-the-fact repair and re-scheduling. Thus, rather than considering the resource consumption map as a historical representation of what has happened in the past (e.g., this time last week, last month, or last year), it is now used to represent a prediction of what is likely to happen in the near future.

Using the map, and taking into account the current system load (perhaps as determined by the same system that records historical usage information), a prediction of future resource requirements can be made, taking the past as a reflection of future periodic load jobs and complex queries that are to be applied to the EDW alongside existing workloads.

Thus, periodic loading, determined by monitoring historical behavior over time, can be projected into the future. The predicted loading can be presented as a "future heat map" or a map of predicted database system resource consumption. Here a system operator, or the system itself, can monitor the predicted loading to detect the appearance of possible overload zones. Since system operators may not be on duty full-time, an alert-driven system may be used. Thus, the system can monitor its own current state, along with the state it is predicted to have in the future, and generate an alert when some selected predicted resource consumption threshold is reached. This may be designated as the predefined critical consumption level in some embodiments. The alert can be presented in the form of a physical alarm (visual and/or aural), or as a message, such as an email message.

In various embodiments, this approach can be extended to predict the future utilization of one or more individual resources (e.g., processor(s), memory, I/O) so that alerts can be sent out in advance of the overload condition actually occurring—giving the operator sufficient time to take corrective action, such as throttling back the available resources for less critical work. This type of operation may enable running with reduced throttling levels, on average, since overload warnings will now be made available in advance of an impending threshold breach, such as the prediction of 95% CPU loading (or any other selected resource utilization level) in three hours (or any other selected time).

In some embodiments, the historically-driven predictions can be used to drive the throttles directly. By classifying the relative "criticality level" of different workloads, the system is able to throttle back available resources for less critical workloads, ultimately shutting them off completely, or switching them to an alternative system, if desired. Such actions can be implemented by having the system run an "alarm script" that is activated automatically, upon determining that some threshold loading is slated to occur within some selected time frame.

In accordance with these principles, and to address some of the challenges described above, many embodiments operate to predict future system loading, based on historical patterns, combined with current loading, to predict system loading in the future. Resource throttling can be implemented prior to the system reaching some desired threshold resource consumption level. Thus, various embodiments look into the future, take into account the time before a predicted potential overload situation is to occur, and determine what compensatory action should be taken, and when (e.g., send email, throttle resources, redirect workloads, etc.). Some of the implementation details used to realize various embodiments will now be discussed.

FIG. 1 illustrates a display 100 of predicted future events, according to various embodiments of the invention. In this display 100, a timeline 102 is available, with a movable cursor 118 to indicate the desired point in time where system loading is to be observed. The display 100 has a rewind feature 104 that allows system administrators to go back to a desired point in the past 112 to look at the resource consumption imposed by queries, loads, etc. as they were then present. There is also a fast forward feature 110 that allows system administrators to go forward to a desired point in the future 116, to look ahead to predicted system loading at some point beyond the present 114.

This mechanism allows administrators to fast forward into the future where, based upon the current load within the system and scheduled future events (e.g., a nightly data load and batch processing queries), a picture of what is about to happen within the system can be generated. Thus, alerts can be given in advance, based upon the predictions, and throttling applied as needed to avoid the predicted overload situation.

For example, as shown in FIG. 1, the display 100 indicates current loading conditions over a selected range 122 of ten days, in this case a single column is used for each day, from Sep. 8, 2009 to Sep. 17, 2009, with the first column indicating system loading on Sep. 9, 2009, the second on Sep. 9, 2009, and so on.

Assuming the current date is Sep. 11, 2009, and the current time is midnight, the last cell 124 in the fourth column reflects the actual system loading conditions for that date and time (i.e., 55% system loading). Prior dates and times 126 provide a historical record of actual system loading measured during those times. Future times and dates 130 provide predictions of system loading, obtained using various mechanisms described herein. Similar maps 128 can be obtained for loading of one or more processors, average loading among a group of processors, etc.

The cursor 118 on the timeline 102 has been placed a little over two days into the future, where an alarm condition is indicated, using an exclamation point character, or some other icon. This location on the timeline 102 corresponds with the ALARM indicator, perhaps triggered by a selected alarm prediction threshold of 89%, which shows that a system loading of 90% is likely to occur between two and three a.m. on Sep. 14, 2009. Other alarm thresholds may be selected.

The administrator might then act to click on the ALARM indicator 132 to reveal further details concerning which workloads are expected to be in operation at that time, and what resources they are expected to consume. The system may then operate automatically to throttle less critical workloads a day or more into the future, if the predicted overload continues to exist, so that overloading does not in fact actually occur.

In some embodiments, the fast forward feature 110 can be used to continually look ahead in time, at selected intervals (e.g., day by day, as shown in FIG. 1). The amount of time depends on the nature of the changes involved in throttling or moving workloads within or between systems, prior to the predicted point of resource exhaustion (e.g., the predefined critical consumption level).

In some embodiments, the use of the fast forward feature 110 may allow the administrator to identify periods in the near future where the use of "Capacity on Demand" may be appropriate, to acquire and apply an appropriate License Key in order enable extra capacity on the system in either a permanent or temporary capacity.

In summary, various embodiments involve monitoring and recording system loading over extended periods of time, to determine the expected behavior of the system, including periodic load jobs, regularly scheduled complex queries, and other significant system loads. Whether or not a load is determined to be "significant" may involve measuring whether the system resource consumption increases more than some selected threshold amount when that load is applied, such as using an extra 2% or 5% of processor cycles, or an extra 10% of memory, etc. Then, based upon the current resource consumption (e.g., based on the last 30 minutes of system resource consumption statistics) plus the resource consumption expected in the future (based on historically monitored and future scheduled load jobs and complex queries, for example), the predicted resource consumption map can be developed for some desired future point in time. Alerts can be configured to trigger at some selected amount of time in advance of a predicted excess consumption event, such as half an hour (or any other selected amount of time) before it is determined that the predicted level of consumption will breach a selected threshold for memory use (or any other resource). In this way, corrective action can be taken prior to the event actually occurring. In some embodiments, prediction-based alerts can be used to govern the top end performance of the EDW, so that adjustments are made just before heavily loaded situations actually occur, such that higher average throttle settings can be employed overall.

In some embodiments, an algorithm will be used that learns, with or without human intervention, to characterize and/or group similar loading elements. For example, a systems manager, such as the Teradata® Multi-Systems Manager (MSM) product can be adapted to receive events from load servers indicating the beginning and ending of individual load jobs. Using auto-registration and instrumentation features, the MSM can learn which load jobs will occur at what times, and these can be grouped, perhaps as scheduled versus ad-hoc jobs. In this way, repeating behavior can be detected, monitored, and predicted.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 2:
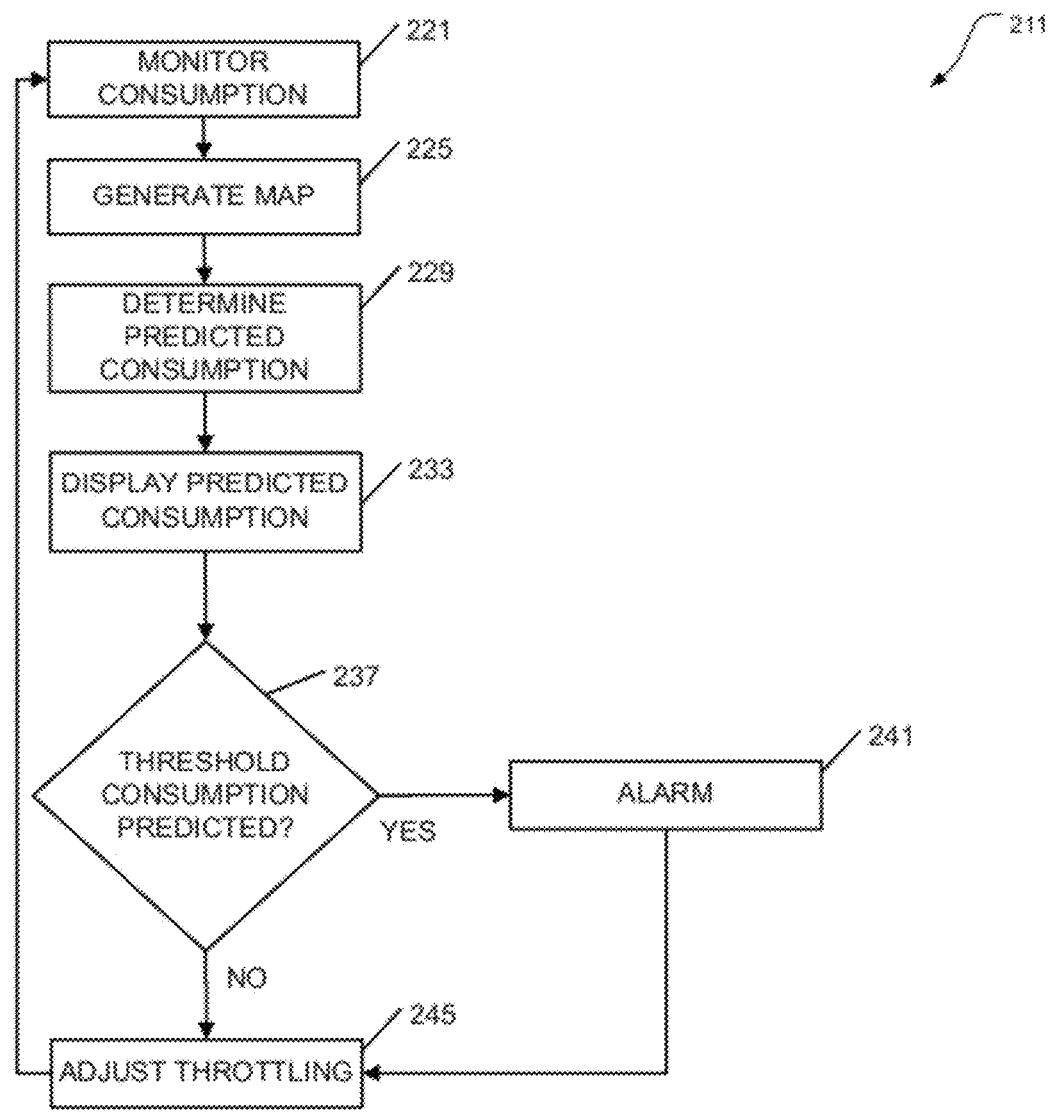
FIG. 2 is a flow diagram illustrating several methods of managing data processing resources according to various embodiments of the invention.

FIG. 2 is a flow diagram illustrating several methods 211 of managing data processing resources according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

For the purposes of this document, a "workload" may be defined as the data processing system (e.g., an EDW) load imposed by the activities of data loading (loading data from an external entity to a database), data export (exporting a copy of data from a database to an external entity), or data query (can load or insert data, or summarize loaded data).

In some embodiments, the method 211 may comprise a processor-implemented method to execute on one or more processors that perform the method. Thus, the method 211 may begin at block 221 with monitoring database system resource consumption over time, in conjunction with scheduled data loading, data export, and query operations. The monitoring can be implemented in any of the ways noted herein, or as described in U.S. Pat. No. 7,730,171, incorporated by reference herein in its entirety.

Database system resources that can be monitored include processor usage, memory usage, and I/O operations. Thus, the activity at block 221 may comprise monitoring at least one of processor usage, memory usage, or I/O operation quantity, as scheduled data loading, data export, and query operations occur over time. In some embodiments, the monitoring activity at block 221 includes monitoring current database system resource consumption over time across multiple database systems, in conjunction with scheduled data loading and query operations.

A systems manager, such as the aforementioned MSM, can receive messages regarding the timing, periodicity, and resource consumption associated with external loading activity. The MSM can thereafter send messages within the system that communicate resource consumption at various times. The MSM knows the identity of load servers, and messages sent to the MSM can be used to learn predictable resource consumption patterns that occur, in order to become a part of the predicted resource consumption map. The MSM is also aware of from where load jobs operate, when they run, the resource consumption during that time, and the periodicity of various jobs. This information can also be used to predict consumption in the future. Processes may have process IDs, or signatures, that can be recognized in the future. Thus, the activity at block 221 may comprise receiving messages generated by a systems manager, the messages communicating at least one of timing, periodicity, or resource consumption associated with external load operations.

Instead of, or in parallel with the system manager that provides messages regarding resource use associated with external loads, a time-based data collection service (DCS) that collects EDW usage statistics periodically (e.g., every 30 seconds) may also be accessed. For example, statistics on node utilization and the use of other resources associated with the EDW can be provided. Thus, the activity at block 221 may comprise accessing data provided by a time-based DCS to determine at least one of timing, periodicity, or resource consumption associated with the external loads.

A systems manager (e.g., a server) can operate to identify scheduled data loading, data export, or query operations by monitoring messages and registration information, to detect recurring system behavior associated with specific jobs. Thus, the activity at block 221 may comprise receiving event messages and automatic registration information associated with data loading, data export, or query jobs. Additional activity at block 221 may comprise categorizing the data loading, data export, or query jobs as scheduled data loading, data export, or query operations based on a selected number of repeated occurrences associated with the data loading, data export, or query jobs.

The method 211 may continue on to block 225 with generating a database system resource consumption map based on the monitoring activity of block 221. In some embodiments, the database system resource consumption map (sometimes called a "heat map" by those of ordinary skill in the art, as noted previously) can be generated by recording maximum resource consumption for processor usage, I/O operations, and memory usage over time (e.g., per hour). Thus, the activity at block 225 may comprise generating a map of maximum resource consumption amounts per unit time associated with current database system resource consumption.

The method 211 may continue on to block 229, with determining the predicted amount of system resource consumption at one or more times in the future. Predictions can be assembled as noted previously, projecting historical monitoring information into the future, along with current loading and any expected future activity (e.g., loads and/or queries) that has been scheduled.

Future resource needs can be displayed. For example, the method 211 may comprise displaying the predicted database resource consumption in conjunction with a specific future time. The future time display may be automatically scaled (e.g., linearly or logarithmically scaled) to include the next expected time where the predicted database system resource consumption reaches a predefined critical consumption level, which may be defined in advance of system operation as a level of resource consumption at which one or more defined system resources is consumed, and which meets or exceeds some selected consumption threshold. Thus, the method 211 may continue on to block 233 with displaying predicted database resource consumption in conjunction with a specific future time, perhaps along a scaled timeline that includes a current time and the specific future time.

The method 211 may continue on to block 237 with determining whether some predicted future amount of resource consumption is expected to meet or exceed a selected consumption threshold, such as a predefined critical consumption level.

Alarms can be used to indicate approaching time periods where the current database resource consumption is expected to meet or exceed the predefined critical consumption level. Alarms can also trigger sending messages and/or running a script. Thus, if a predicted future amount of resource consumption is expected to meet or exceed a selected critical consumption level, as determined at block 237, the method may continue on to block 241 with activating an alarm to indicate that the current database resource consumption is expected to reach the predefined critical consumption level within a selected alarm time period.

Whether or not a critical consumption condition is expected in the future, as determined at block 237, the method 211 may include, at block 245, adjusting database system workload throttling to accommodate predicted database system resource consumption based on the resource consumption map and current system loading induced by at least one of data loading, data export, or query activity, prior to the current database resource consumption reaching a predefined critical consumption level.

When multiple database systems are being monitored, throttling may be initiated prior to the current database system resource consumption for any one or more of the multiple database systems reaching a predefined critical consumption level. Individual systems may have different defined critical consumption levels.

Database system workload throttling may be implemented by defining environments for specific workloads, limiting the amount of processor time or percent utilization for defined workloads, and/or by prioritizing workloads. For the purposes of this document, a "user" means a machine that transmits data to be loaded, and/or transmits queries, to the database. Thus, the activity at block 245 may comprise at least one of shifting data loads over time, restricting processor usage, restricting a number of concurrent user sessions, or restricting a number of reports generated for a selected time period.

Workload throttling can be adjusted within the EDW itself by switching from one workload definition, where workloads have their normal operating parameters, to another definition, where some workloads are given reduced or potentially no access to the EDW, since EDW resources are typically consumed when loading or query activity occurs. Thus, the activity at block 245 may comprise changing workload definitions to provide reduced access to data warehouse resources associated with the database system.

Workload throttling can be adjusted by filtering or rejecting queries from one or more users. Thus, the activity at block 245 may comprise at least one of filtering or rejecting requests initiated by a selected user for a selected time period.

Workload throttling can include removing workload access rights. Thus, the activity at block 245 may comprise removing workload access rights associated with at least one of the data loading, data export, or query activity.

Workload throttling may include moving data from one database system, to another, so that a predicted excessive workload for one of the systems can be avoided. Thus, the activity at block 245 may comprise moving data from a first one of multiple database systems to a second one of the multiple database systems, wherein the predicted relative database resource consumption for the first one is greater than the predicted relative database resource consumption for the second one.

Workload throttling may also include redirecting loading processes and/or queries. For example, a session director server may be available to proactively direct/move queries to a preferred system or a fallback system. Thus, the activity at block 245 may comprise redirecting a loading process or queries from a first one of multiple database systems to a second one of the multiple database systems, wherein the predicted relative database resource consumption for the first one is greater than the predicted relative database resource consumption for the second one.

The methods described herein do not have to be executed in the order described, or in any particular order. Moreover, various activities described with respect to the methods identified herein can be executed in repetitive, serial, or parallel fashion. The individual activities of the methods shown in FIG. 2 can also be combined with each other and/or substituted, one for another, in various ways. Information, including parameters, commands, operands, and other data, can be sent and received in the form of one or more carrier waves. Thus, many other embodiments may be realized.

The methods shown in FIG. 2 can be implemented in various devices, as well as in a computer-readable storage medium, where the methods are adapted to be executed by one or more processors. Further details of such embodiments will now be described.

Figure 3:
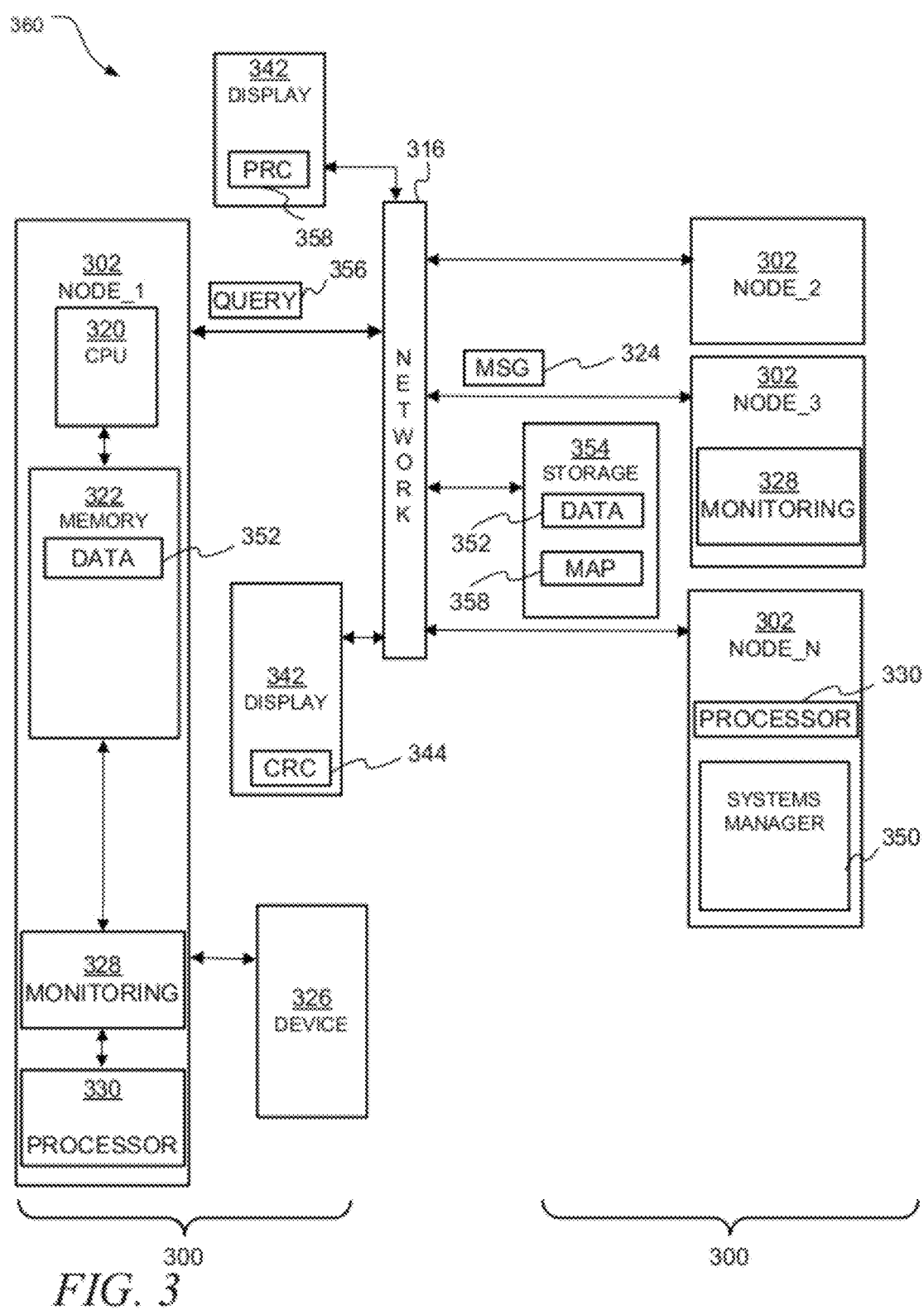
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement data processing resource management may comprise one or more processing nodes 302, one or more processors 320, 330, memories 322, one or more user input devices 326, a data monitoring module 328, and one or more displays 342. The apparatus 300 may comprise a client, a server, or a networked processing node.

The processing nodes 302 may in turn comprise physical machines or virtual machines, or a mixture of both. The nodes 302 may also comprise networked entities, such as servers and/or clients. In some cases, the operations described herein can occur entirely within a single node 302. In some embodiments then, an apparatus 300 may comprise a monitoring module 328 to monitor database system resource consumption over time, in conjunction with scheduled data loading, data export, and query operations.

The apparatus 300 may further comprise one or more processors 320, 330 to generate a database system resource consumption map 358 based on the database system resource consumption over time, and to adjust database system workload throttling to accommodate predicted database system resource consumption based on the resource consumption map and current system loading induced by at least one of data loading, data export, or query activity, prior to the current database resource consumption reaching a predefined critical consumption level.

The monitoring module 328 may comprise a systems manager, such as an MSM. Thus, the monitoring module 328 may comprise a processing node (e.g., NODE_N) housing a systems manager 350 to receive messages 324 associated with the database system resource consumption.

The data 352 can be processed by multiple processors 330, and distributed among multiple nodes, including storage nodes 354. Thus, the apparatus 300 may comprise multiple database processors 330, coupled to corresponding storage nodes 354 that form a portion of a database system (e.g., system 360).

Data processing and storage can likewise be distributed among multiple nodes, which may use data access module processors to process the data 352. Thus, the apparatus 300 may comprise a first node (e.g., NODE_1) to house a storage medium (e.g., memory 322) used to store data 352 supplied by data loading activity, and a second node (e.g., NODE_N) to house one or more processors 330 comprising at least one data access module processor.

Current and predicted database system resource consumption can be displayed. Thus, the apparatus 300 may comprise one or more displays 342 to display the current database resource consumption (CRC) 344 and the predicted database resource consumption (PRC) 358.

A client machine can be used to formulate and transmit queries 356. Thus, the apparatus 300 may include one or more users comprising nodes 302 or user input devices 326 (e.g., a client machine) to transmit queries 356.

Still further embodiments may be realized. For example, it can be seen that a system 360 that operates to implement data processing resource management may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_2, NODE_3, NODE_N, and one or more storage nodes 354.

The apparatus 300 and systems 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
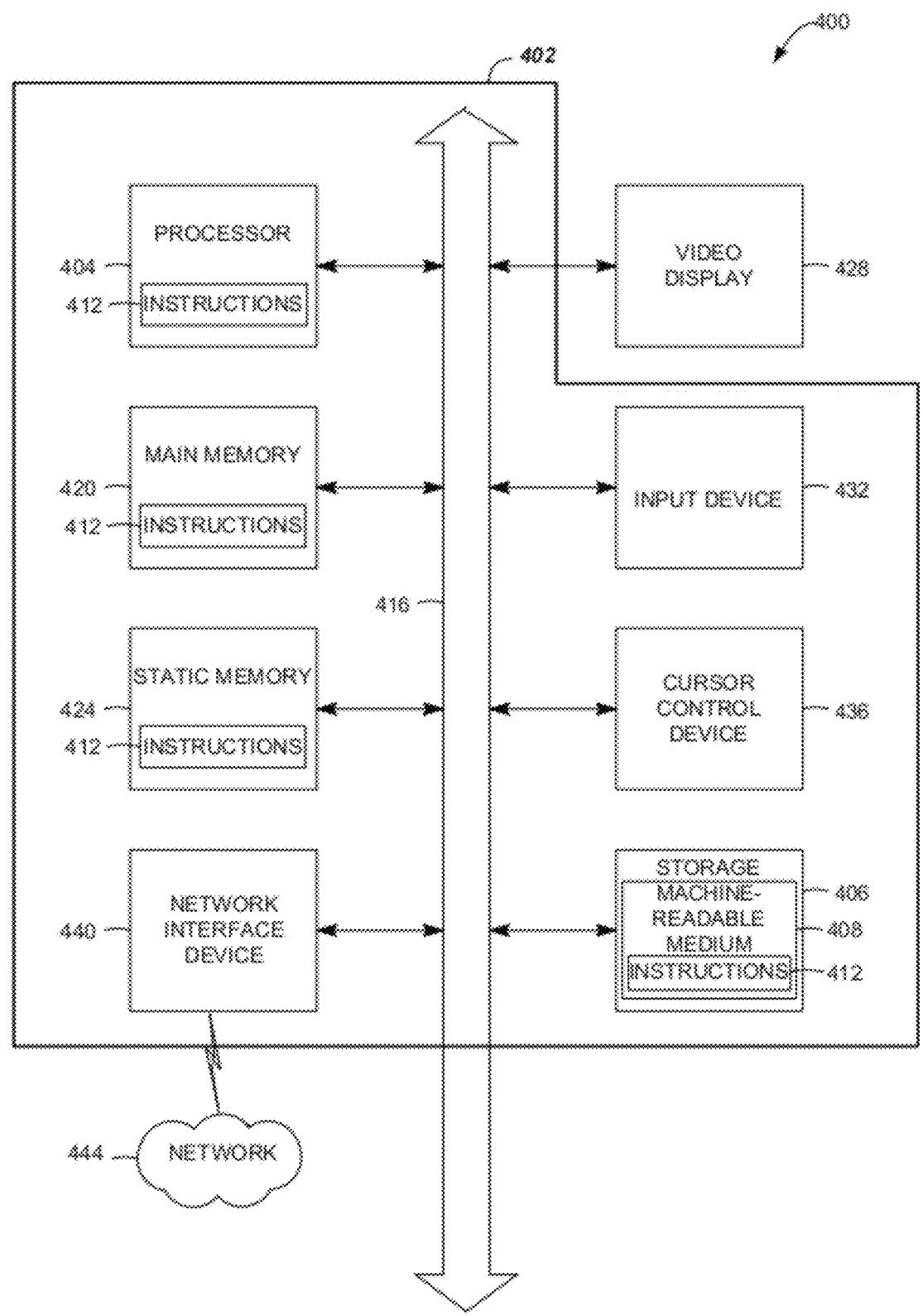
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++/C#. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412). The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include non-transitory, tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to improve the management of data storage, so that an EDW, for example, can operate more efficiently. In addition, the EDW may be better protected against overloading due to prediction-based alarming that operates to automatically throttle system resources prior to the occurrence of an overloading event. Increased customer satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a monitoring module to monitor database system resource consumption over time, in conjunction with scheduled data loading, data export, and query operations, said monitoring comprising:
receiving event messages associated with an occurrence of data loading, data export, or query jobs;
receiving automatic registration information associated with the data loading, data export, or query jobs; and
categorizing the data loading, data export, or query jobs as the scheduled data loading, data export, and query operations based on a number of repeated occurrences associated with the data loading, data export, or query jobs; and
a processor to:
generate a database system resource consumption map based on the database system resource consumption over time and in consideration of maximum resource consumption of the database system resource consumption taken over the time with respect to data loading, data export, and query operations of the database system;
determine, based on the database system resource consumption map and current database system loading associated with current database resource consumption, a predicted database system resource consumption as a projection of the system resource map;
adjust database system workload throttling to accommodate the predicted database system resource consumption based on the database system resource consumption map and current system loading induced by at least one of data loading, data export, or query activity, prior to the current database resource consumption reaching a predefined critical consumption level; and
wherein the adjusting comprises:
at least one of shifting data loads over time, restricting processor usage, restricting a number of concurrent user sessions, or restricting a number of reports generated for a selected time period.

2. The apparatus of claim 1, wherein the monitoring module comprises:
a processing node housing a systems manager to receive messages associated with the database system resource consumption.

3. The apparatus of claim 1, further comprising: multiple database processors, including the processor, coupled to corresponding storage nodes that form a portion of the database system.

4. The apparatus of claim 1, further comprising:
a first node to house a storage medium used to store data supplied by the data loading; and
a second node to house the processor comprising at least one data access module processor.

5. The apparatus of claim 1, further comprising: a display to display the current database resource consumption and the predicted database system resource consumption.

6. A processor-implemented method to execute on one or more processors that perform the method, comprising:
monitoring database system resource consumption over time, in conjunction with scheduled data loading, data export, and query operations, said monitoring comprising:
receiving event messages associated with an occurrence of data loading, data export, or query jobs;
receiving automatic registration information associated with the data loading, data export, or query jobs; and
categorizing the data loading, data export, or query jobs as the scheduled data loading, data export, and query operations based on a number of repeated occurrences associated with the data loading, data export, or query jobs;
generating a database system resource consumption map based on the monitoring; and
adjusting database system workload throttling to accommodate predicted database system resource consumption based on the database system resource consumption map and current system loading induced by at least one of data loading, data export, or query activity, prior to current database system resource consumption reaching a predefined critical consumption level; and
wherein the adjusting comprises:
at least one of shifting data loads over time, restricting processor usage, restricting a number of concurrent user sessions, or restricting a number of reports generated for a selected time period.

7. The method of claim 6, wherein the monitoring comprises:
monitoring at least one of processor usage, input/output operation quantity, or memory usage as the scheduled data loading, data export, and query operations occur over time.

8. The method of claim 6, wherein the monitoring comprises:
receiving messages generated by a systems manager, the messages communicating at least one of timing, periodicity, or resource consumption associated with external loads.

9. The method of claim 6, wherein the generating comprises:
generating a map of maximum resource consumption amounts per unit time associated with the current database system resource consumption.

10. The method of claim 6, wherein the adjusting comprises:
changing workload definitions to provide reduced access to data warehouse resources associated with the database system.

11. The method of claim 6, wherein the adjusting comprises:
at least one of filtering or rejecting requests initiated by a selected user for a selected time period.

12. The method of claim 6, wherein the adjusting comprises:
removing workload access rights associated with at least one of the data loading, data export, or query activity.

13. The method of claim 6, further comprising:
activating an alarm to indicate that the current database system resource consumption is expected to reach the predefined critical consumption level within a selected alarm time period.

14. The method of claim 6, wherein the monitoring comprises:
accessing data provided by a time-based data collection service to determine at least one of timing, periodicity, or resource consumption associated with external loads.

15. The method of claim 6, further comprising:
displaying the predicted database system resource consumption in conjunction with a specific future time along a scaled timeline that includes a current time and the specific future time.

16. A processor-implemented method to execute on one or more processors that perform the method, comprising:
  monitoring current database system resource consumption over time across multiple database systems, in conjunction with scheduled data loading and query operations, said monitoring comprising:
    receiving event messages associated with an occurrence of data loading or query jobs;
    receiving automatic registration information associated with the data loading or query jobs; and
    categorizing the data loading or query jobs as the scheduled data loading and query operations based on a number of repeated occurrences associated with the data loading or query jobs;
  generating a database system resource consumption map based on the monitoring; and
  adjusting database system workload throttling to accommodate predicted database resource consumption based on the database system resource consumption map and current system loading induced by at least one of data loading or query activity, prior to the current database system resource consumption for a first one of the multiple database systems reaching a predefined critical consumption level; and
    wherein the adjusting comprises:
      redirecting a loading process or queries from a first one of the multiple database systems to a second one of the multiple database systems, wherein predicted relative database system resource consumption for the first one is greater than predicted relative database system resource consumption for the second one.

17. The method of claim 16, wherein the adjusting comprises:
  moving data from the first one of the multiple database systems to a second one of the multiple database systems, wherein the predicted relative database system resource consumption for the first one is greater than the predicted relative database system resource consumption for the second one.

18. A non-transitory computer readable storage medium storing at least executable computer code, wherein the executable computer code includes:
  executable computer code for monitoring database system resource consumption of one or more database systems over time, in conjunction with scheduled data loading, data export, and query operations of the one or more database systems, said monitoring comprising:
    receiving event messages associated with an occurrence of data loading, data export, and query jobs;
    receiving automatic registration information associated with the data loading, data export, and query jobs; and
    categorizing the data loading, data export, and query jobs as the scheduled data loading, data export, and query operations based on a number of repeated occurrences associated with the data loading, data export, and query jobs; and
  executable computer code for generating a database system resource consumption map based on the database system resource consumption over time, and to adjust database system workload throttling to accommodate predicted database system resource consumption of the one or more database systems based on the database system resource consumption map and current system loading induced by at least one of data loading, data export, or query activity of the one or more database systems, prior to current database resource consumption reaching a predefined critical consumption level; and
    wherein the adjusting comprises:
      at least one of shifting data loads over time, restricting processor usage, restricting a number of concurrent user sessions, or restricting a number of reports generated for a selected time period.

* * * * *